United States Patent [19]

Peterson

[11] Patent Number: 5,303,137
[45] Date of Patent: Apr. 12, 1994

[54] MULTIRESONANT SELF-OSCILLATING CONVERTER CIRCUIT

[75] Inventor: William A. Peterson, Vestal, N.Y.

[73] Assignee: Dawn Technologies, Ltd., Vestal, N.Y.

[21] Appl. No.: 923,957

[22] PCT Filed: Dec. 4, 1991

[86] PCT No.: PCT/US91/09080

§ 371 Date: Sep. 3, 1992

§ 102(e) Date: Sep. 3, 1992

[51] Int. Cl.$^5$ ............................................. H02M 3/337
[52] U.S. Cl. ...................................... 363/16; 363/17; 363/49; 363/56
[58] Field of Search ............... 363/16, 17, 49, 56, 363/131, 132, 146; H02M 3/337, 3/338

[56] References Cited

U.S. PATENT DOCUMENTS

| | | | |
|---|---|---|---|
| 4,692,851 | 9/1987 | Attwood | 363/16 |
| 4,814,962 | 3/1989 | Magalhaes et al. | 363/16 |
| 4,860,189 | 8/1989 | Hitchcock | 363/132 |
| 4,864,479 | 9/1989 | Steigerwald et al. | 363/17 |
| 4,945,467 | 7/1990 | Bhagwat | 363/132 |

FOREIGN PATENT DOCUMENTS

| | | |
|---|---|---|
| 1638310 | 3/1971 | Fed. Rep. of Germany . |
| 2036866 | 4/1971 | Fed. Rep. of Germany . |
| 60-167683 | 8/1985 | Japan ........................... H02M 7/06 |

OTHER PUBLICATIONS

"Nonlinear Analysis of a Family of LC Tuned Inverters," F. C. Y. Lee and T. G. Wilson, *PESC 74 Record*, pp. 223-231, Jun. 10, 1974.

"A New Family of Isolated Zero-Voltage-Switched Converters," R. Farrington, M. M. Janonovic and F. C. Y. Lee, *1991 IEEE 0-7803-0900-r/91/0700-0209*, pp. 209-215, Apr. 1991.

"Comparative Study of Voltage-Mode Resonant Converters with Transformers," T. Nimomiya, T. Higashi, M. Nakahare and K. Harada, *IEEE 0-7803-0900-4/-91-0700-0474*, pp. 474-480, Apr. 1991.

*Primary Examiner*—William H. Beha, Jr.
*Attorney, Agent, or Firm*—Robert O. Nimtz

[57] ABSTRACT

A direct current to direct current converter utilizes a MOSFET half-bridge configuration in which the inherent magnetizing and leakage inductances of the transformer are used as the only inductances in the frequency-determining circuit. Diodes are used to limit the voltages across the capacitor of the frequency determining circuit and hence limit the short circuit and open circuit characteristics of the converter. A self-starting circuit insures that the circuit will start up when initially energized.

5 Claims, 4 Drawing Sheets

TIME

MULTIRESONANT SELF-OSCILLATING CONVERTER CIRCUIT

TECHNICAL FIELD

This invention relates to direct-current-to-direct-current power supplies and, more particularly, to simple, inexpensive power converters providing improved short circuit and open circuit operation.

BACKGROUND OF THE INVENTION

The proliferation of electronic equipment, both for business purposes and for entertainment, has increased the need for small, inexpensive and efficient power supplies. One common type of power supply is a dc-to-dc converter which accepts electrical power at one voltage level, converts it to high frequency alternating current, uses a transformer to both adjust the voltage level and to isolate the power source from the electronic load, and rectifies the resulting alternating current to direct current to operate the electronic equipment. Such converters are simple, low cost means for providing the required power. The reason the intermediate alternating current is at a high frequency is to reduce the size of the required transformer. Such converters are often used to power portable equipment or to recharge batteries in the equipment. Some dc-to-dc power supplies are powered by standard household current rectified to provide the direct current input and taking the form of plug-mounted structures where the entire power supply is supported by the electrical connector pins on the plug.

In power supplies such as plug-mounted converters, size, weight and cost are critical. Reducing the number of components is critical in reducing size and complexity of the converter. It has been found that resonant, self-oscillating dc-to-dc converters may meet many of the requirement of such plug-mounted converter applications. A family of push-pull converters is analyzed in "Nonlinear Analysis of a Family of LC Tuned Inverters" by F. C. Y. Lee and T. G. Wilson, PESC 74 Record, pages 223-231, Jun. 10, 1974. In order to avoid the higher breakdown requirements of the push-pull converter configuration, it has been suggested to utilize a half-bridge zero-voltage-switched configuration to reduce the cross-transistor voltages by half. Such configurations are disclosed in "A New Family of Isolated Zero-Voltage-Switched Converters" by R. Farrington, M. M. Jananovic and F. C. Lee, 1991*IEEE* 0-7803-0090-4/91/0700-0209, pages 209-215, April 1991, and "Comparative Study of Voltage-Mode Resonant Converters with Transformers" by T. Ninomiya, T. Higashi, M. Nakahara and K. Harada, 1991*IEEE* 0-7803-0090-4/91-0700-0474, pages 474-480, April 1991.

All of these prior art converters require either expensive and lossy square loop magnetics or complicated control circuitry, thereby increasing the size and weight of converters. Moreover, these prior art converters also have poor short circuit and/or open circuit characteristics, requiring expensive and complicated special overload protection control circuitry.

SUMMARY OF THE INVENTION

In accordance with the illustrative embodiment of the present invention, a small, compact dc-to-dc converter using the half-bridge configuration includes a frequency-determining circuit requiring only the inherent magnetizing and leakage inductance of the transformer and no separate inductive element. Open circuit and short circuit operation are improved by clamping the voltage across the frequency-determining capacitor to a voltage which is less than the input direct current voltage. This lower voltage level is obtained by autotransformer action in which the capacitor is connected to an intermediate point on a transformer winding across which the full input direct current voltage is applied. This clamps the maximum voltage across the capacitor to a voltage determined by the so-called "tap up" ratio of the autotransformer winding. The resulting reduction in capacitor voltage, in turn, reduces the maximum short circuit current through the load to a safe value. To initiate oscillations in the converter circuit, a start-up circuit comprising a zener diode and a silicon controlled rectifier applies a turn-on signal to one of the transistors in the half-bridge when the circuit is energized.

A major advantage of the converter circuit of the present invention is the ability to place all of the necessary components into a small, lightweight package particularly suitable for plug mounted power supplies used for battery recharging and for powering portable electronic equipment.

Another major advantage of the converter circuit of the present invention is the inherent overload performance of the voltage clamping feature by means of which the overload current is limited to a safe value.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
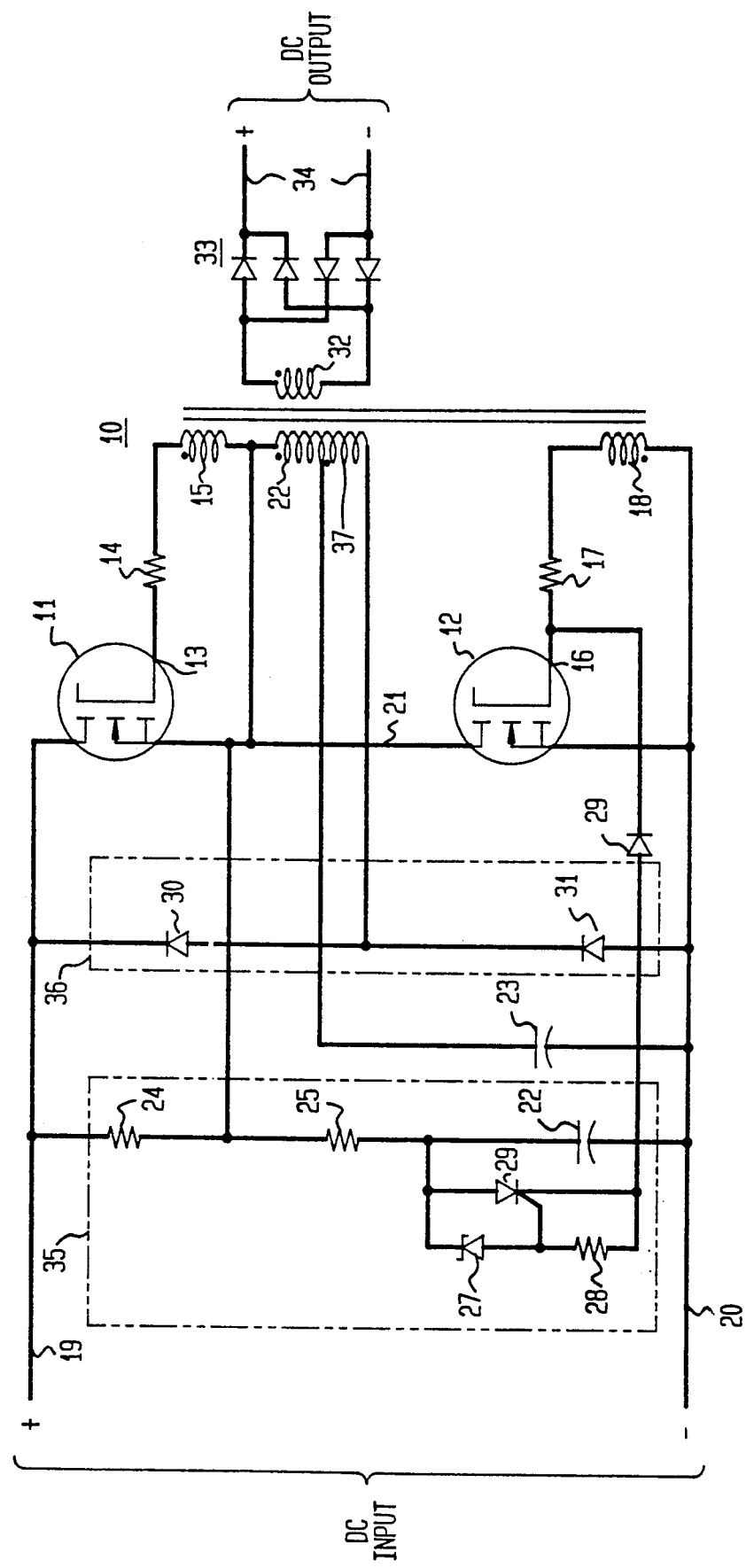
FIG. 1 shows a detailed circuit diagram of a half-bridge converter circuit in accordance with the present invention.

Referring more particularly to FIG. 1 there is shown a schematic diagram of a dc-to-dc converter in accordance with the present invention comprising a transformer 10 and two MOSFET transistors 11 and 12. The gate 13 of transistor 11 is connected through resistor 14 to the upper end of a driver winding 15 of transformer 10 while the gate 16 of transistor 12 is connected through resistor 17 to the opposite end of drive winding 18 of transformer 10. A direct current source is connected between conductors 19 and 20, in turn, connected across the drain to source series connected transistors 11 and 12. The common source-drain connection 21 of transistors 11 and 12 is connected to the midpoint of resistors 24 and 25 as well as to the primary winding 22 of transformer 10. The secondary winding 32 of transformer 10 is connected to a full-wave rectifier 33 to provide a direct current voltage at output leads 34.

Transistors 11 and 12 form a "half bridge" connection to alternately connect the direct current voltage on conductors 19 and 20 to one end of primary winding 22. The other end of primary winding 22 is connected to one side of capacitor 23 which, in turn, is connected to the negative conductor 20 from the direct current source. The other end of primary winding 22 is connected to the clamp winding 37 of transformer 10. The other end of clamp winding 37 is connected to a voltage clamping circuit 36 including diodes 30 and 31 connected in series between the supply conductors 19 and 20. The lower end of clamp winding 37 is connected to the midpoint of diodes 30 and 31. The operation of the clamping circuit 36 will be discussed in detail in connection with FIG. 2.

The alternating current voltage across winding 22 is coupled by transformer action to the gate drive windings 15 and 18 and, through resistors 14 and 17, to gates 13 and 16, respectively. The polarity of the gate drive windings 15 and 18 is such as to provide positive feedback to transistors 11 and 12. That is, when either of transistors 11 and 12 begins to conduct, the voltage across its gate drive winding (15 or 18) tends to drive the transistor into greater conduction, and when either of transistors 11 and 12 starts to reduce conduction, the voltage across its gate drive winding tends to cut the transistor off.

Assuming that MOSFET transistor 12 is conducting, transistor 11 is cut off, and that the charge on capacitor 23 is positive at the connection to winding 22, the voltage on capacitor 23 is applied to the winding 22, negative at the dot at the top of winding 22. This voltage is coupled to gate drive windings 15 and 18, also negative at the dot at the top of winding 15 and negative at the dot at the bottom of winding 18. The voltage from winding 18 is applied through resistor 17 to the gate 16 of transistor 12 to drive transistor 12 further into conduction. At the same time, the voltage from winding 15 is applied through resistor 14 to the gate 13 of transistor 11, tending to cut transistor 11 off. This process continues until transistor 12 saturates and the current can no longer grow. Due to the magnetizing inductance of transformer 10, and the reflected load current, current continues to flow in winding 22, discharging capacitor 23 and reducing the voltage across winding 22. The reduction in voltage across winding 22, in turn, is coupled to the gate windings 15 and 18. When the voltage on gate drive winding 18 is insufficient to maintain transistor 12 fully conducting, transistor 12 will start to turn off. The reduction in current in the magnetizing inductance of transformer 10 is opposed by the energy stored in the magnetizing inductance, producing a reverse voltage across the magnetizing inductance and hence across winding 22. This voltage will be positive at the dots on transformer windings 22 and 37 and will tend to turn transistor 12 fully off and to turn transistor 11 on. This positive feedback continues until transistor 11 is saturated and transistor 12 is fully off.

At this point in time, the positive direct current conductor 19 is connected to the dot end of winding 22 by way of transistor 11 and center connection 21. The other end of primary winding 22 is connected to the now discharged capacitor 23. The voltage across winding 22 is coupled to winding 15 to rapidly drive transistor 11 into full saturation. At the same time, capacitor 23 charges toward the input voltage on conductor 19, thus reducing the voltage on primary winding 22. This reduction in voltage across primary winding 22 is coupled to gate drive winding 15 tending to reduce conduction in transistor 11. When the voltage on gate drive winding 15 is insufficient to maintain transistor 11 in full saturation, transistor 11 starts to turn off. At the same time, the voltage on gate drive winding 18 will tend to turn transistor 12 on. Eventually, transistor 11 is turned fully off and transistor 12 is driven into full saturation, thus returning to the starting condition assumed above. The above-described cycle is repeated endlessly, maintaining the switching action. Diodes 30 and 31 clamp the voltage on capacitor 23 to prevent excessive voltages if the Q of the resonant circuit formed by capacitor 23 and the magnetizing inductance of transformer 10 is too high. In effect, diodes 30 and 31 clamp the voltage on capacitor 23 to a voltage which is less than the input direct current voltage across conductors 19 and 20 by the turns ratio of winding 22 and winding 37, the so-called "tap up" ratio.

The half-wave converter of FIG. 1 has a stable condition when both transistors 11 and 12 are turned off, and this is the condition which the circuit assumes when first turned on. A start-up circuit 35 comprising resistors 24 and 25 and capacitor 22 is connected across conductors 19 and 20. Start-up circuit 35 further includes zener diode 27, resistor 28 and silicon controlled rectifier (SCR) 29. Start-up circuit 35 serves to initiate oscillations is the circuit of FIG. 1 when it is first energized. The application of any substantial voltage to conductors 19 and 20 charges capacitor 22, eventually causing zener diode 27 to break down. The resulting current flow into the gate of SCR 29 turns SCR 29 on. The voltage on capacitor 22 is then fed by SCR 29 through diode 29 to the gate 16 of transistor 12, turning transistor 12 on. At the same time, capacitor 23 is charged through resistor 24 and the upper portion of winding 22. These are the conditions assumed at the beginning of the description of the oscillatory action.

If the input voltage is insufficient for resonant oscillations to be sustained, then capacitor 26 will discharge through resistor 17 and winding 18. The value of resistor 17 is such that this discharge current is insufficient to maintain SCR 29 turned on and hence SCR 29 will turn off, returning the start-up circuit to the initial conditions. The start sequence will begin again if there is an adequate voltage across conductors 19 and 20, and will continue to repeat until the resonant circuit sustains oscillations. During sustained oscillations, the values of resistor 24 and capacitor 26 provide a "corner frequency" which prevents the high frequency signal generated during oscillations from producing a voltage magnitude on capacitor 26 sufficient to break down zener diode 27. In this way, the start up circuit is maintained inoperative when the circuit is oscillating.

Figure 2:
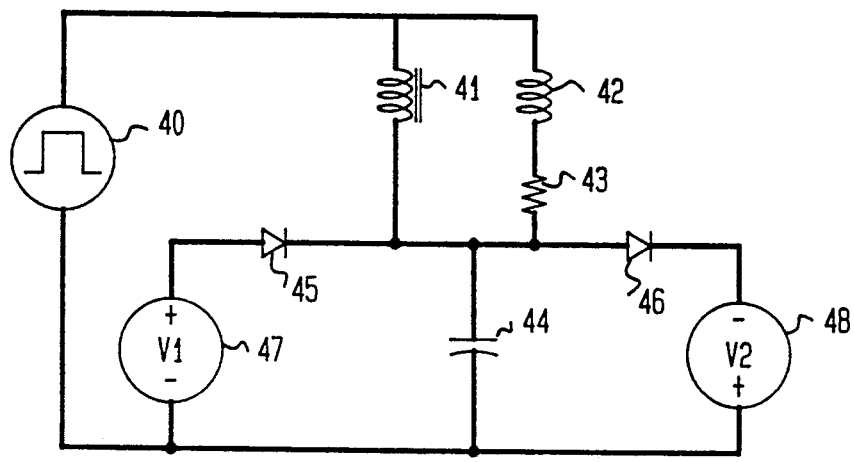
FIG. 2 shows an equivalent circuit for the converter circuit of FIG. 1.

The conditions required to maintain oscillations in the circuit of FIG. 1 includes the requirement that the ring through caused by the magnetizing current must be sufficient to initiate conduction of the other transistor. In FIG. 2 there is shown an equivalent circuit with the half bridge transistors replaced by a square wave source 40. Inductor 41 is the magnetizing inductance of the transformer 10 of FIG. 1. Inductor 42 is the leakage inductance between the primary and secondary windings of transformer 10. Resistor 43 represents the load resistance on the secondary of transformer 10 reflected by the turns ratio into the primary of the transformer. Capacitor 44 is the resonating capacitor, with its voltage limited by diodes 45 and 46 to the voltages represented by sources 47 (V1) and 48 (V2), respectively. The magnitudes of voltages V1 and V2 are equal and above ground (V1) and below the peak of the input voltage across conductors 19 and 20 (V2) by the primary tap up ratio.

The resonant circuit consists of the capacitor 44 in series with the parallel combination of magnetizing inductance 41 and the serial combination of the leakage inductance 42 and the reflected load resistance 43. If there is no load (resistor 43 is very large), leakage inductance 42 is essentially out of the circuit and the resonant circuit is the capacitor 44 in series with the magnetizing inductance 41. The resonant frequency at no load will therefore be at a minimum and the Q of the circuit will be at its highest. The voltage on capacitor 44 will be limited by diodes 45 and 46 and sources 47 and 48. This voltage appears across the load 43.

As the load is increased and the load resistor 43 is reduced in value, the effect of leakage inductance 42 is increased and the resonant frequency shifts toward the parallel combination of inductors 41 and 42. The increased current in the load 43 extracts energy from the resonant circuit, reducing the Q of the circuit. At full load, the Q of the circuit is reduced to the point where diodes 45 and 46 are just barely conducting. The peak voltage on the magnetizing inductance 41 remains constant and the voltage across the load resistance 43 is substantially constant, reduced only by the series impedance of the leakage inductance 42.

If the converter is over-loaded, the resistance of load 43 is reduced and the energy delivered by the resonant circuit to load 43 is also reduced. At short circuit, where resistor 43 is zero, the effective Q of the resonating circuit is again high. The voltage on capacitor 44 therefore increases until it is limited by conduction of diode 45 or diode 46. Diodes 46 and 46 therefore clamp the voltage across capacitor 44 to voltages supplied by sources 47 and 48, respectively. These clamping voltages 47 and 48 are less than the supply voltages connected to leads 19 and 20 of FIG. 1, and, indeed, are equal to the difference between these supply voltages on leads 19 and 20 and the voltage provided by the so-called "tap-up" voltage of transformer winding 22. During overload, the total inductance is the series combination of the magnetizing inductance 41 and the leakage inductance 42 and thus the frequency is at a maximum. The current delivered to the short circuit is fed through the leakage inductance 42 which, due to the higher frequency, limits this short circuit current to a safe value.

Figure 3:
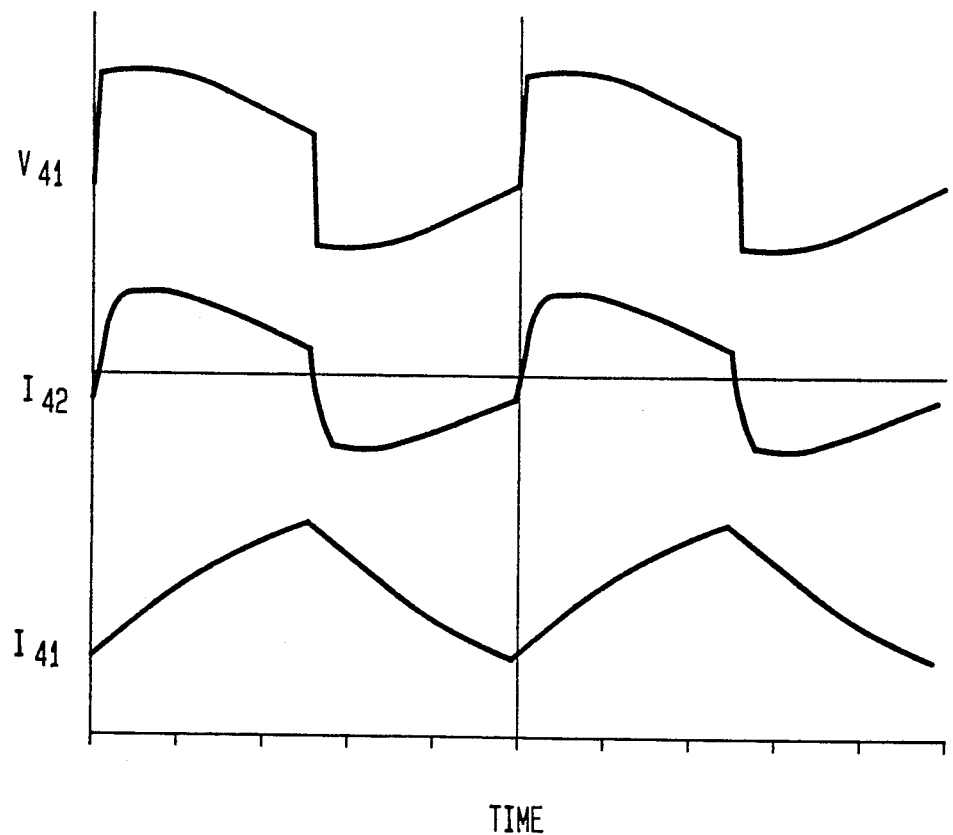
FIG. 3 shows a graphical representation of the currents and voltages in the equivalent circuit of FIG. 2 under full load.

In FIG. 3 there is shown a graphical representation of the current $I_{41}$ through magnetizing inductance 41, the current $I_{42}$ through leakage inductance 42 and the voltage $V_{41}$ across magnetizing inductance 41 under full load. At full load, the Q of the circuit is at a minimum and the voltage waveform $V_{41}$ is not clipped whatsoever. The maximum peak-to-peak swing of the current $I_{42}$ in FIG. 3 is approximately one ampere.

Figure 4:
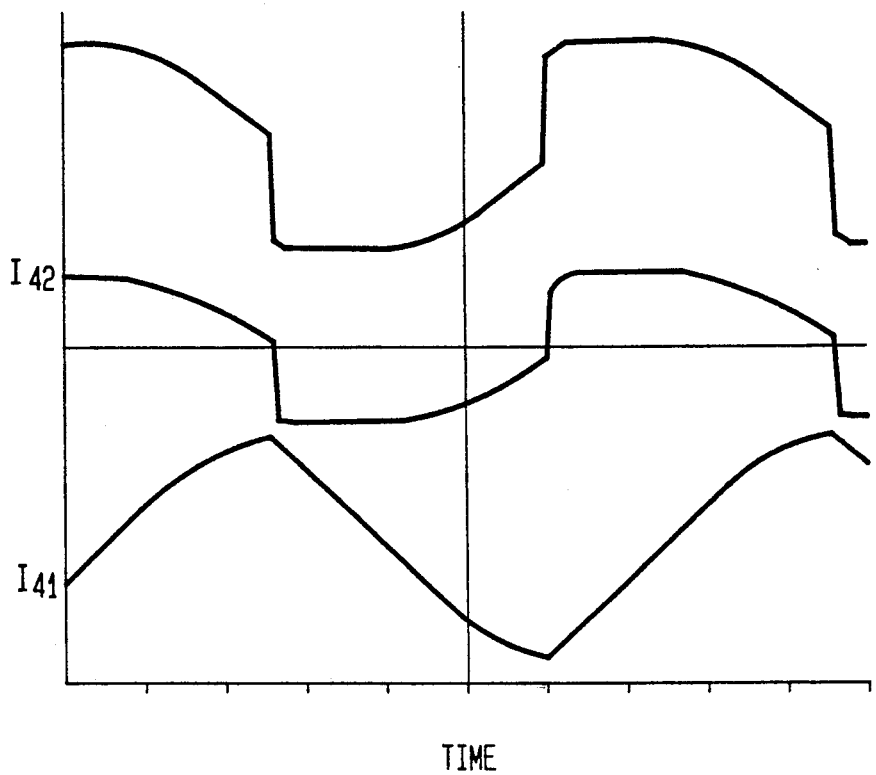
FIG. 4 shows a graphical representation of the currents and voltages in the equivalent circuit of FIG. 2 under light load.

In FIG. 4, these same waveforms are shown under very light load. The peak-to-peak amplitude of the current $I_{42}$ in FIG. 4 is only on the order of 100 milliamperes, reflecting the low load current. The voltage peak amplitudes show little change, but these voltage waveforms exhibit significant clipping by the diodes 45–46 of FIG. 2.

Figure 5:
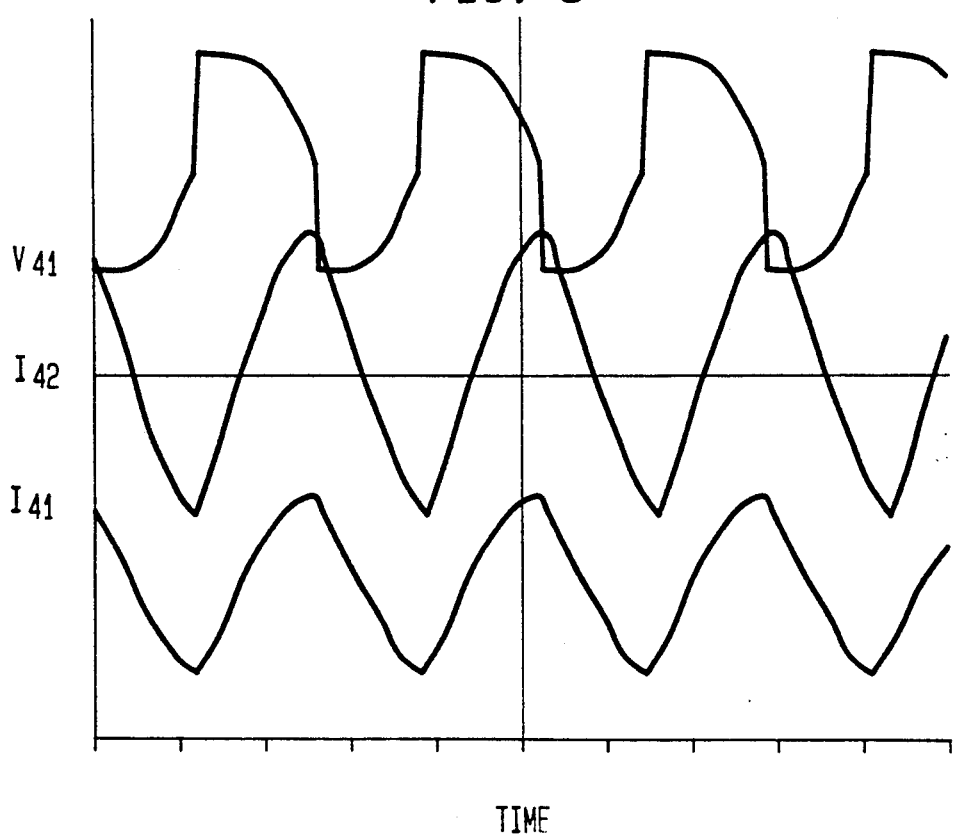
FIG. 5 shows a graphical representation of the currents and voltages in the equivalent circuit of FIG. 2 under overload or short circuit conditions.

In FIG. 5, these waveforms are shown under overload conditions, with a short circuit across the output. Under overload conditions, the frequency is higher and the voltage waveform $V_{41}$ is being clipped. The current through the leakage inductance $V_{42}$, and hence through the short circuit, is safely limited due to the voltage reduction caused by the clipping diodes 45 and 46. The peak-to-peak current value of $I_{42}$ in FIG. 3 is on the order of four amperes, a high but controllable value.

It can be seen that a multiresonant, self-oscillatory converter is disclosed in which the inherent properties of the transformer in the form of magnetizing and leakage inductances are used as part of the frequency-determining circuit. This obviates the need for a separate inductor element in the frequency-determining circuit, thereby reducing the number of components, and hence the cost, of the circuit. By resonating the leakage inductance, a substantially larger value of leakage inductance is tolerable than would be the case for other circuits operating at the same frequency. In addition, the resonant action of the converter produces zero voltage during turn-on of both MOSFET transistors 11 and 12 under all conditions. This zero switching voltage reduces the switching losses in the transistors. Furthermore, at full load the Q of the circuit is not substantially greater than one, thereby limiting the turn-off current and hence the circulating energy in the circuit. Finally, resonance is used to limit positive feedback instead of using expensive, lossy square loop transformer cores as are used in some of the prior art circuits. In addition, the present converter utilizes a half-bridge configuration rather than a push-pull configuration, thereby limiting the maximum voltage across the switching transistors to the level of the input voltage rather than twice the input voltage as is found in push-pull circuits.

Figure 6:
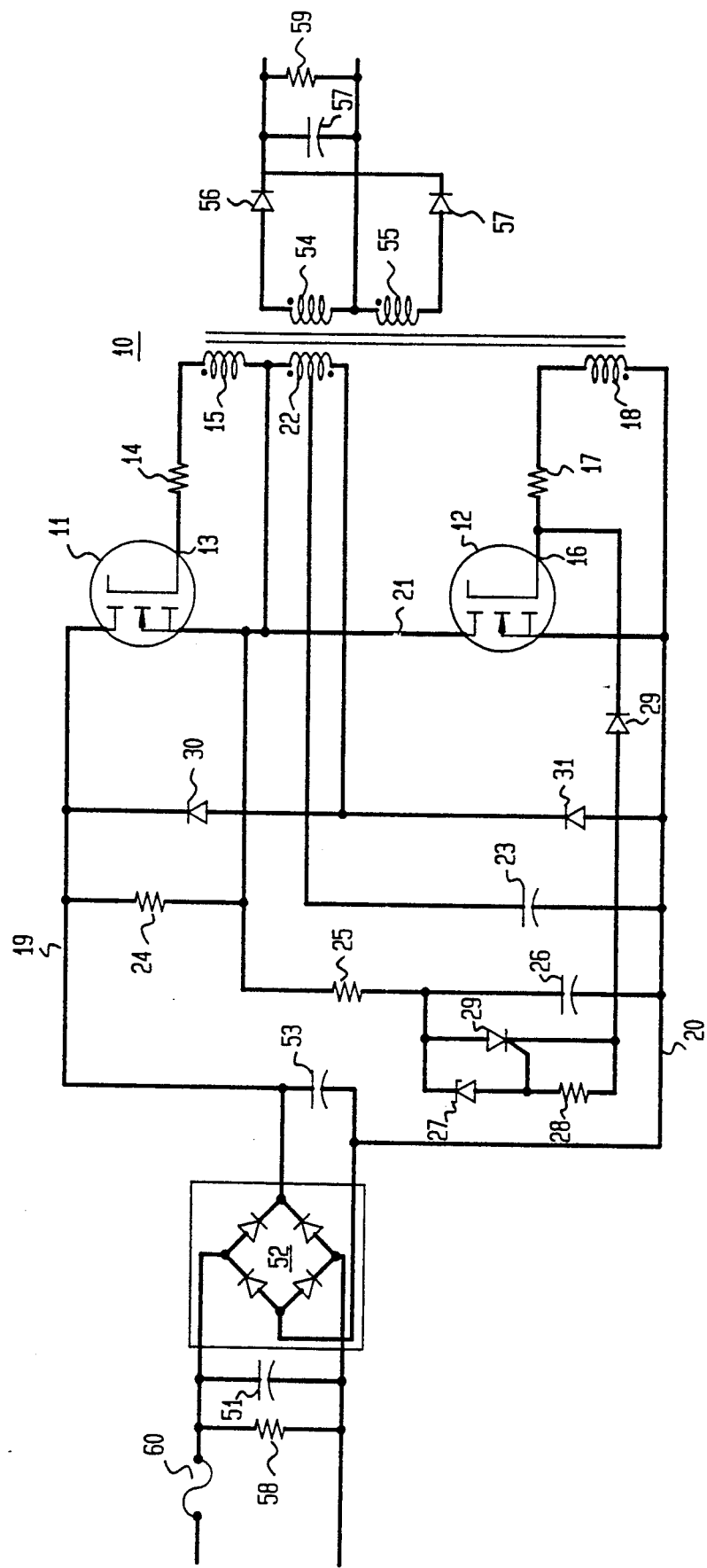
FIG. 6 show a detailed circuit diagram of a preferred embodiment of the half-bridge converter circuit of the present invention.

In FIG. 6 there is shown a preferred embodiment of the invention to be used in a plug-mounted power supply operating from a standard 117 volt, 60 Hertz, alternating current source, and producing a nominal 14 volts of direct current at a delivered power level of 35 watts. In FIG. 6, the alternating current input is delivered through fuse 60 to a low pass filter comprising resistor 58 and capacitor 51 to remove high frequency components of the input current: The filtered alternating current is applied to full wave rectifier 52, the output of which appears across smoothing capacitor 53. The voltage across capacitor 53 is applied across conductors 19 and 20. The bulk of the converter circuit of FIG. 6 is identical to that shown in FIG. 1 and identical reference numerals are used. The output circuit, however, consists of two secondary windings 54 and 55 with rectifying diodes 56 and 57 connected thereto. Capacitor 58 filters out high frequency components of the rectified voltage while resistor 59 prevents the output from charging to exceptionally high voltages due to commutation spikes on the voltage waveform at no load. The full load frequency of this power supply is approximately 100 kilohertz with a magnetizing inductance of 258 microhenries and a leakage inductance of 40 microhenries.

It should also be clear to those skilled in the art that further embodiments of the present invention may be made by those skilled in the art without departing from the teachings of the present invention.

What is claimed is:

1. A direct current power converter comprising a source of direct current voltage, a single transformer having primary windings and a load winding, a pair of transistors connected in a half-bridge configuration across said primary windings of said single transformer, a feedback path for producing oscillations in said transistors and including said primary windings of said single transformer, a multiresonant circuit in said feedback path and including a series inductance effectively connected in series with said load and shunt inductance effectively connected in parallel with said load, and a capacitor effectively connected in series with both said series inductance and said parallel inductance, said capacitor being connected between an intermediate point on one of said primary winding and said source of direct current voltage, and voltage limiting means connected between said source of direct current voltage and one end of said one primary winding for limiting the voltage across said capacitor to a voltage substantially less than said source of direct current voltage.

2. The direct current power converter according to claim 1 further comprising means for initiating oscillations in said converter by applying a start-up signal to one of said transistors.

3. The direct current power converter according to claim 1 wherein said shunt inductance comprises the magnetizing inductance of said transformer and said series inductance comprises the leakage inductance of said transformer.

4. The direct current power converter according to claim 1 wherein said means for limiting the voltage across said capacitor comprises a pair of diodes for clamping the voltage across said capacitor to a voltage less than said direct current voltage.

5. The direct current power converter according to claim 4 wherein said voltage less than said direct current voltage is obtained by autotransformer action.

* * * * *